United States Patent
Scherer et al.

(10) Patent No.: US 10,181,775 B2
(45) Date of Patent: Jan. 15, 2019

(54) ROTOR OF AN ASYNCHRONOUS MACHINE

(71) Applicant: SIEMENS AKTIENGESELLSCHAFT, München (DE)

(72) Inventors: Matthias Scherer, Nürnberg (DE); Josef Niedermeyer, Hilpoltstein (DE); Uwe Scharf, Schwabach (DE)

(73) Assignee: AUDI AG, Ingolstadt (DE)

(*) Notice: Subject to any disclaimer, the term of this patent is extended or adjusted under 35 U.S.C. 154(b) by 0 days.

(21) Appl. No.: 15/566,624

(22) PCT Filed: Mar. 31, 2016

(86) PCT No.: PCT/EP2016/056999
§ 371 (c)(1),
(2) Date: Oct. 13, 2017

(87) PCT Pub. No.: WO2016/165947
PCT Pub. Date: Oct. 20, 2016

(65) Prior Publication Data
US 2018/0123432 A1    May 3, 2018

(30) Foreign Application Priority Data
Apr. 14, 2015 (EP) .................... 15163462

(51) Int. Cl.
*H02K 17/16* (2006.01)
*H02K 15/00* (2006.01)
(Continued)

(52) U.S. Cl.
CPC ..... *H02K 15/0012* (2013.01); *B22D 19/0054* (2013.01); *H02K 1/274* (2013.01);
(Continued)

(58) Field of Classification Search
CPC .... H02K 15/00; H02K 15/0012; H02K 15/02; H02K 17/00; H02K 17/16; H02K 17/165;
(Continued)

(56) References Cited

U.S. PATENT DOCUMENTS 1,375,461 A * 4/1921 Kimble ............... H02K 17/165
29/598
2,292,167 A * 8/1942 Smith .................. H02K 17/16
310/211
(Continued)

FOREIGN PATENT DOCUMENTS

DE          321 731 C      6/1920
DE   10 2009 051 486 A1   5/2011
(Continued)

OTHER PUBLICATIONS

Eichinger et al., U.S. Pat. No. 8,614,528, Dec. 24, 2013, 2011/0127862, Jun. 2, 2011.
(Continued)

*Primary Examiner* — Tran Nguyen
(74) *Attorney, Agent, or Firm* — Henry M. Feiereisen LLC

(57) ABSTRACT

A rotor of an asynchronous machine with a cage rotor includes a laminated core formed from a plurality of partial laminated cores. The laminated core has substantially axially extending conductors arranged in slots in the laminated core. The conductors include at least two materials of different electrical conductivities, such that a material with a higher electrical conductivity surrounds a material with a lower electrical conductivity by at least 65% in a circumferential direction.

7 Claims, 6 Drawing Sheets

(51) Int. Cl.
*H02K 17/18* (2006.01)
*B22D 19/00* (2006.01)
*H02K 1/27* (2006.01)
*H02K 1/32* (2006.01)
*H02K 15/06* (2006.01)
*H02K 17/20* (2006.01)
*H02K 17/22* (2006.01)

(52) U.S. Cl.
CPC ............. *H02K 1/32* (2013.01); *H02K 15/062* (2013.01); *H02K 17/165* (2013.01); *H02K 17/185* (2013.01); *H02K 17/205* (2013.01); *H02K 17/22* (2013.01); *H02K 2213/12* (2013.01)

(58) Field of Classification Search
CPC .. H02K 9/00; H02K 9/06; H02K 9/20; H02K 1/20; H02K 1/32
See application file for complete search history.

(56) References Cited

U.S. PATENT DOCUMENTS

| | | | | |
|---|---|---|---|---|
| 2,370,458 A * | 2/1945 | Goran | ................ | H02K 15/0012 164/DIG. 10 |
| 3,488,532 A * | 1/1970 | Anderson | ................ | H02K 3/24 310/211 |
| 3,832,583 A * | 8/1974 | Chang | ...................... | H02K 3/48 310/201 |
| 4,362,959 A | 12/1982 | Bartheld et al. | | |
| 4,365,178 A * | 12/1982 | Lenz | ........................ | H02K 1/32 310/216.053 |
| 4,395,816 A * | 8/1983 | Pangburn | ................. | H02K 1/32 164/DIG. 10 |
| 6,900,573 B2 * | 5/2005 | Edwards | ............ | B22D 19/0054 310/211 |
| 8,836,193 B2 * | 9/2014 | Buttner | ................ | H02K 17/165 310/125 |

FOREIGN PATENT DOCUMENTS

| | | |
|---|---|---|
| EP | 0 703 659 A1 | 3/1996 |
| EP | 2 434 618 A1 | 3/2012 |
| EP | 2 744 089 A1 | 6/2014 |
| JP | 2011078158 A * | 4/2011 ............. H02K 17/16 |

OTHER PUBLICATIONS

PCT International Search Report and Written Opinion of International Searching Authority dated Mar. 13, 2017 corresponding to PCT International Application No. PCT/EP2016/056999 filed Mar. 31, 2018.

* cited by examiner

ROTOR OF AN ASYNCHRONOUS MACHINE

CROSS-REFERENCES TO RELATED APPLICATIONS

This application is the U.S. National Stage of International Application No. PCT/EP2016/056999, filed Mar. 31, 2016, which designated the United States and has been published as International Publication No. WO 2016/165947 A1 and which claims the priority of European Patent Application, Serial No. 15163462.3, filed Apr. 14, 2015, pursuant to 35 U.S.C. 119(a)-(d).

BACKGROUND OF THE INVENTION

The invention relates to a rotor of an asynchronous machine, an asynchronous machine with such a rotor, and a production method for producing such a rotor.

Due to their simple design, asynchronous machines with cage rotors form robust motors and are therefore suitable for numerous applications.

To generate a sufficient starting torque in such a machine, inter alia deep-bar rotors are used, but these have comparatively high radial slots containing rectangular or wedge-shaped rods. Due to the radial height of these slots, the teeth between two slots are embodied as relatively narrow in the region of the base. This results inter alia in the development of saturation effects in the rotor lamination that impair the operational performance of the machine.

To improve the energy efficiency of asynchronous machines, use is also made of copper hybrid motors, wherein, in the case of larger motors, in particular larger shaft heights, there is a problem that it is comparatively difficult to connect different conductive materials, such as, for example, copper rod and aluminum. This means the copper rods have to have a special geometric shape, but this makes the production of such a rotor more expensive.

Herein, the above-mentioned hybrid motors are provided with copper rods that can be introduced comparatively loosely into a slot provided for this purpose in the motor's rotor. Then, the electrical connections and fittings for the copper rods in the slot are produced by means of an aluminum diecasting method. Herein, the aluminum encloses the copper rod in the slot and on the outside, i.e. on the end faces of the rotor, forms the so-called end ring for connecting the rods to one another.

In the case of larger machines, in particular greater shaft heights, because of the difficulty in connecting copper and aluminum the copper rods must be inserted with a special coating.

Hence, herein the drawback is the complicated production method for asynchronous machines with cage rotors, in particular for efficiency classes of these asynchronous machines of above IE4.

SUMMARY OF THE INVENTION

Proceeding herefrom, the invention is based on the object of providing a rotor of an asynchronous machine enabling simple production of a cage rotor, and hence an asynchronous machine, that also satisfies energy efficiency classes for these asynchronous machines of above IE4.

The object is achieved by a rotor of an asynchronous machine with at least one cage rotor, wherein the rotor has at least one laminated core with substantially axially extending conductors, which are arranged in slots in the rotor and wherein the conductors comprise at least two materials of different electrical conductivities, wherein the material with the higher electrical conductivity surrounds the material with the lower electrical conductivity by at least 65% when considered in the circumferential direction.

The object is also achieved by a method for producing a rotor of an asynchronous machine with at least one cage rotor, wherein the rotor has at least one laminated core with substantially axially extending conductors, which are arranged in slots in the rotor and wherein the conductors comprise at least two materials of different electrical conductivities, wherein the material with the higher electrical conductivity surrounds the material with the lower electrical conductivity by at least 65% when considered in the circumferential direction by means of the following steps:

punch-lamination of a laminated core or partial laminated core, axial alignment of the slots in the rotor, axial insertion of hollow pipes with high electrical conductivity, in particular copper pipes, into the laminated core or partial laminated cores such that the partial laminated cores are arranged on a conductor, wherein a predetermined spacing is established between the partial laminated cores, expansion of the hollow pipe by means of high pressure, casting-in of material with lower electrical conductivity than that of the hollow pipe, wherein the hollow pipe is filled by the material and simultaneously the end rings are also formed on the end faces of the rotor.

Hence, according to the invention, hollow rods with comparatively high electrical conductivity, in particular copper hollow rods, are inserted into the slots of the laminated core in the rotor and filled with a further conductive material, preferably aluminum, by means of a diecasting method.

The clamping pressure between, in this case, aluminum and copper means that coatings that may be needed to prevent tearing effects between these materials are not necessary or only partially necessary.

According to the invention, the electrically conductive material, such as, for example, copper in the form of a hollow section, is now arranged on the side walls of the slots in the rotor where, as a result of the skin effect, the alternating current of the main current flow occurs. This is generally very low in the squirrel-cage rotor at nominal operation of the asynchronous machine.

The embodiment according to the invention of the rotor/rotating part has advantages in particular in the case of overload or during start-up of the asynchronous machine. The increase in the slip of the asynchronous machine associated with overload results in an increase in the said skin effect/current displacement in the rotor. The materials with comparatively higher electrical conductivity which are now present now cause the rotor, and hence the asynchronous machine, to heat up more slowly and hence to be able to withstand overload for longer.

In principle, slip of the asynchronous machine, and hence also thermal loading on the rotor due to the strong current displacement at the radial edge of the slots of the rotor, is maximum during the start-up process. For the start-up process, therefore, it is advantageous for the comparatively less conductive material, such as, for example, aluminum to be predominantly located as closely as possible to the outer diameter of the rotor in order to guarantee comparatively fast acceleration of the machine. According to the invention, parallel electrical connection of the materials with better electrical conductivity enables the material with less electrical conductivity to be located on the far radial edge of the slot while still retaining lower ohmic losses on the entire edge of the slot.

The asynchronous machine equipped in this way according to the invention hence is now able to "cope" with the conditions during the start-up process for longer and, as a consequence, to ramp up against higher moments of inertia.

The embodiment according to the invention of a conductor in a slot in the rotor means that now a part of the slot cross section is occupied by the hollow section. Due to manufacturing restrictions and for electrical reasons, the cast-in material should occupy at least one third of the slot cross section.

Hence, it is now also possible for there to be parallel-edged teeth in the rotor without saturation effects occurring in the rotor lamination. This is also achieved according to the invention in that materials with different degrees of conductivity are arranged in the slot and consequently guarantee a high starting torque of the asynchronous machine with a comparatively reduced slot height.

In a further embodiment, the hollow section has a slot that extends axially at least in sections so that expansion is possible in a simple way even with lower pressures. Herein, the substantially axially extending slit can quite possibly occupy up to about one third of the circumference of the hollow profile. Herein, it is still guaranteed that, during the production method with internal high-pressure assembly, the hollow section nestles against the respective side walls of the slot. In such an embodiment, it is therefore advantageous for the start-up process for the comparatively less conductive material, such as, for example, aluminum to be predominantly located as closely as possible to the outer diameter of the rotor in order to be able to guarantee a comparatively fast run-up of the machine. According to the invention, parallel electrical connection of the more electrically conductive materials enables the less electrically conductive material to be introduced on the far radial edge of the slot, i.e. in the region of the air gap, while still retaining lower ohmic losses on the entire edge region of the slot.

In another embodiment, in the axial direction, the rotor is formed from a plurality of partial laminated cores in each case spaced apart from one another by a cooling gap. This cooling gap now has two advantages: on the one hand, this enables a cooling system, in particular of the rotor, to be implemented in that the cooling flow flowing in an axial direction into the cooling ducts of the rotor exits via the radial cooling gaps and, for example, enters cooling gaps of the stator via the air gap of the dynamoelectric machine.

A further advantage consists in the fact that, according to the invention, in particular when the hollow profiles have a closed design when considered in the circumferential direction, the hollow profiles bridge these cooling gaps. Now, in the subsequent aluminum diecasting method, it is no longer necessary to solve the problem that the aluminum diecasting exits via the radial cooling gaps or that gap between two partial laminated cores has to be sealed. It is also possible with rotors with a plurality of partial laminated cores arranged axially one after the other, for each partial laminated core to be produced like an independent rotor and embodied according to the invention in order then to weld, solder etc. the partial laminated cores to one another. Herein, for example, each partial laminated core has an end ring on its end faces. Herein, the decisive factor is that there is now an electrically conductive disk or ring between the partial laminated cores, which connects the respective conductors or conductor rods emerging from the adjacent partial laminated cores to one another electrically. Herein, as far as the conductor cross-section of this disk or ring is concerned it is quite possible.

Hence, this provides a simple way of providing staggered rotors for asynchronous machines, wherein each partial laminated core in the rotor can be arranged twisted about a predetermined angle in the circumferential direction with respect to the partial laminated core arranged therebefore in the axial direction.

Advantageously, when considered in the circumferential direction, alternatively or supplementarily thereto, the hollow pipe has different wall thickness so that this also implicitly influences the current displacement within the conductor in a slot in the rotor.

The method for producing a rotor according to the invention now has the advantage that the hollow profiles [are], either in a separate step or by aluminum diecasting, not only filled, but also simultaneously expanded and, on the expansion of the hollow conductor, simultaneously establish a positive connection with the side walls of the slot.

Herein, the aluminum diecasting not only causes the hollow conductor to be filled with aluminum, the end rings providing an electrically conductive connection between the adjacent rods are also formed on the end faces of the rotor. In order to obtain an advantageous positive and friction connection between the hollow profiles and the end ring, on the one hand, the hollow profiles have an axial projection over the laminated core, and, on the other, in particular the ends of these hollow profiles are provided with surface-area-increasing structures that improve the adherence of the hollow profile within the end ring.

The production of a rotor according to the invention now enables the avoidance of tearing effects between the different materials due to the shrinkage of the aluminum on cooling.

Herein, the predetermined hollow profiles, in particular copper hollow profiles, are standard profiles and can be shaped by means of this internal-pressure high-pressure assembly such that they abut the side walls of the slot in a positive-fitting manner. Herein, the hollow profiles can be embodied as standard profiles—but they can also have a wide variety of cross-sectional shapes, such as round, angular, trapezoidal etc.

The embodiment according to the invention of a conductor in a slot in the rotor now causes a part of the slot cross section to be occupied by the hollow section. Due to manufacturing restrictions, such as the ease of flow of this material and electrical reasons, the cast-in material, i.e. for example aluminum, should occupy at least one third of the slot cross section.

The basic design of the rotor can also be transferred to the design and production of a stator for asynchronous machines or synchronous machines, which now has hollow shaped bars and correspondingly, after internal high-pressure assembly—in particular by means of aluminum—form: conductor bars in the slots of the stator. At the end faces of the laminated core of the stator, i.e. in the winding overhang region, these conductor bars are electrically contacted in accordance with a predetermined circuit diagram in that they are connected to one another in an electrically conductive manner by soldering or by clips or litz wires or shaped rods.

BRIEF DESCRIPTION OF THE DRAWING

The invention and further advantageous embodiments of the invention are described in more detail with reference to several exemplary embodiments. Herein, the drawings show.

DETAILED DESCRIPTION OF PREFERRED EMBODIMENTS

Figure 1:
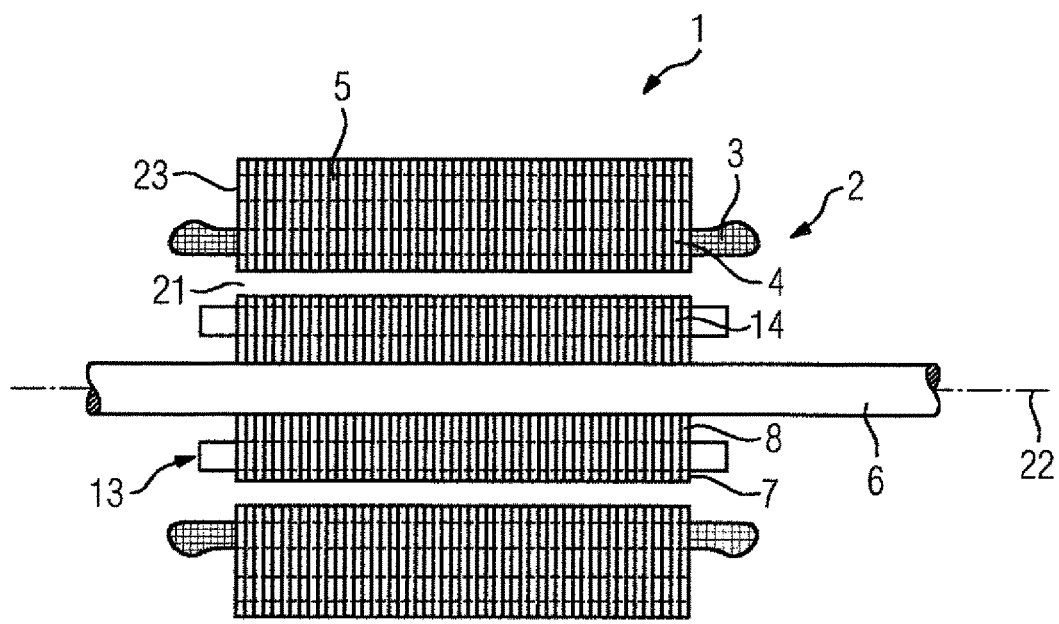
FIG. 1 a basic longitudinal section of an asynchronous machine.

FIG. 1 is a basic longitudinal section showing a dynamo-electric machine 1 embodied as an asynchronous machine with a cage rotor and the substantial active electrical and magnetic parts of this dynamoelectric machine 1. Hence, it does not show bearings, housings, fans etc., which also belong to the fittings of a functional dynamoelectric machine 1.

A rotor 7 or rotating part that is axially rotatable about a shaft 22 is arranged non-rotatably on a shaft 6. In the axial direction, the rotor 7 has a laminated core 8 comprising axially stacked laminations with slots 14 extending substantially in the axial direction. The laminated core of the rotor 7 and/or stator 23 also contains substantially axially extending cooling ducts, but these are only partially shown in this depiction.

The air flow through the cooling ducts in the stator 23 and/or rotor 7 through their axially extending cooling ducts 5 is generated internally or externally by correspondingly mounted fans. The slots 14 in the rotor 7 contain electrical conductors connected to one another in an electrically conductive manner via end rings 13 on the respective end faces of the rotor 7. In slots 4 in the stator 23, the stator 23 has a winding system 2 that forms winding heads 3 on the end faces of the stator 23. This winding system 2 generates magnetic fields that interact electromagnetically with the rotor 7 and the cage winding thereof through an air gap 21. The electromagnetic interaction during the operation of the dynamoelectric machine 1, in particular the stator 23, through the air gap 21 to the rotor 7 causes rotation about the axis 22 to take place in the rotor 7.

Figure 2:
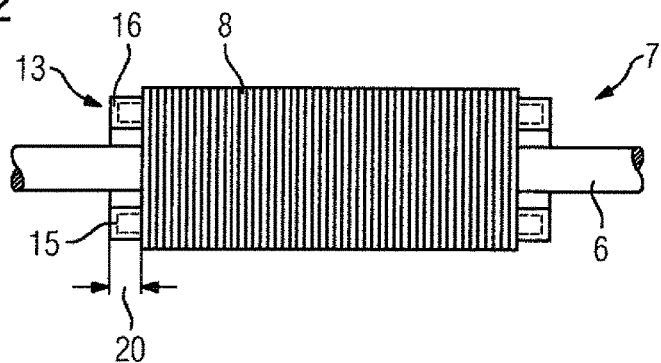
FIG. 2 the basic design of a rotor in longitudinal section.

FIG. 2 shows a rotor 7 with its cage winding and its non-rotating connection on its shaft 6. Conductor bars 15 made of at least two materials of different electrical conductivities protrude axially from the end faces of the rotor 7 or from the laminated core 8 in the rotor 7. A first material with a first electrical conductivity and a material with a second electrical conductivity, wherein the material with the first electrical conductivity is the material with the better electrical conductivity.

In one specific embodiment, the material with a first electrical conductivity is copper, while the material with comparatively poorer electrical conductivity is aluminum.

The conductor bars 15 protruding from the laminated core 8 in the rotor 7 are cast in a material 16—i.e. aluminum for example—with a second electrical conductivity and hence form an end ring 13. The conductor bars 15 are substantially—first—embodied as hollow and are then, both in the end ring 13 and in the conductor bars 15, filled with the material with second electrical conductivity. Herein, the material with the second electrical conductivity is aluminum, while the conductor bar 15 is embodied as a copper hollow profile.

Figure 15:
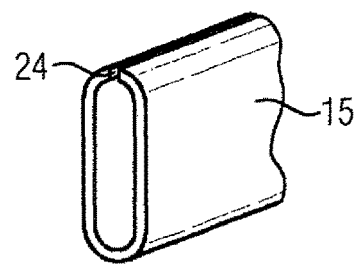
FIGS. 15 and 16 perspective views in each case of a hollow rod.

Hence, a conductor bar 15 with a closed circumference (i.e. without a slit 24 as shown in FIG. 15) and a uniform wall thickness (unlike the case in FIG. 16) at its radial outer circumference has higher electrical conductivity than the aluminum with comparatively low electrical conductivity in the interior of the conductor bar 15.

Figure 4:
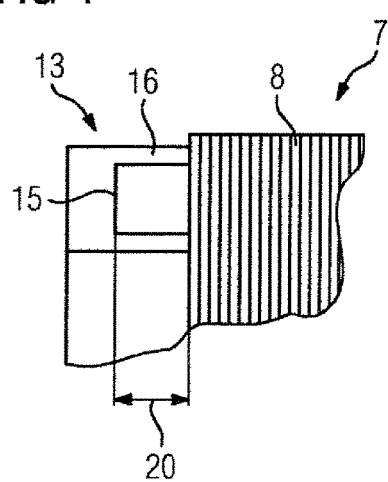
FIGS. 4 and 5 detail sections of an end ring.

FIG. 4 is a detailed representation of the axial projection 20 of the conductor bar 15 into the end ring 13.

Figure 5:
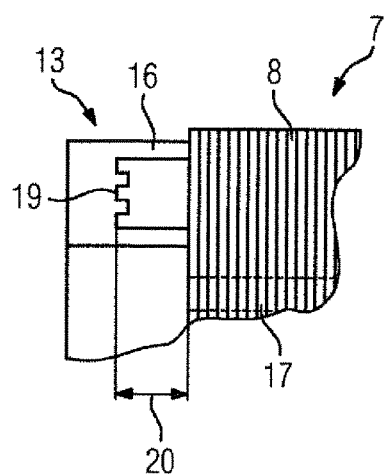

FIG. 5 also shows an axial projection 20 of a conductor bar 15 into the end ring 13, wherein, in this exemplary embodiment, in the region of the end rings 13, the conductor bar 15 has special surface-area-enlarged structures 19 on its end and/or within its axial projection 20 in order to obtain correspondingly improved adherence within the end ring 13. FIG. 5 also shows a cooling duct 17 of the rotor 7 with a substantially axial extension.

Figure 3:
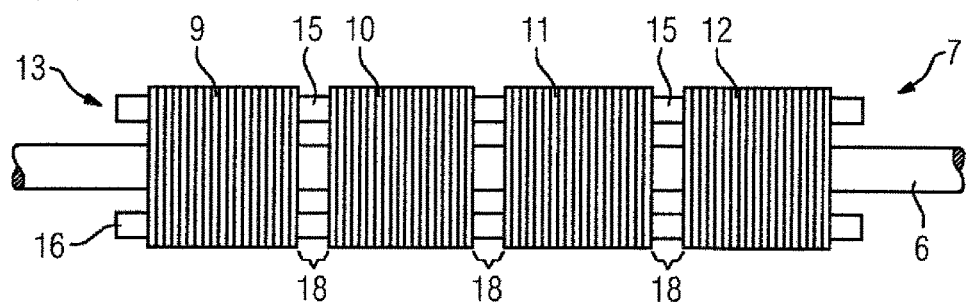
FIG. 3 a basic longitudinal section of a rotor with partial laminated cores.

FIG. 3 shows in a further embodiment a rotor 7 formed by four partial laminated cores 9, 10, 11 and 12. The end rings 13 are also located on the end faces of the rotor 7. Between the partial laminated cores 9, 10, 11 and 12, there are located radial cooling slits 18 separating the partial laminated cores 9, 10, 11 and 12 from one another. During the production of such a rotor 7, the punch-laminated partial laminated cores 9, 10, 11 and 12 are now, optionally now or after filling, non-rotatably connected to the shaft 6. The hollow conductor bars 15 with comparatively high electrical conductivity—i.e. in particular copper hollow profiles—are inserted into the more or less axially aligned slots 14 in the rotor 7. For the filling with a material with comparatively lower electrical conductivity, according to the invention, the conductor bar 15 now simultaneously functions as a seal in the region of the cooling slits 18 for this cast-in material with reduced conductivity. Here again, the copper hollow profiles are expanded either separately or by the aluminum diecasting method and structured such that the lining, i.e. the walls of the hollow profile of the conductor bar 15, nestles in a positive-fitting manner on the side walls of the respective slot 14.

FIG. 6 to FIG. 9 are basic representations of a production method with reference to one single slot 14, wherein the method can be used both for rotors 7 as shown in FIG. 2 and for rotors 7 as shown in FIG. 3, 4, 5 and in principle for stators.

Figure 6:
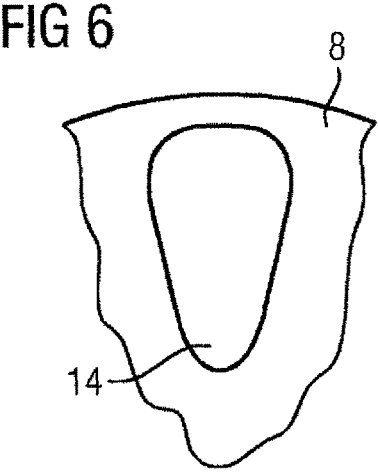
FIGS. 6 to 10 production method.
Figure 7:
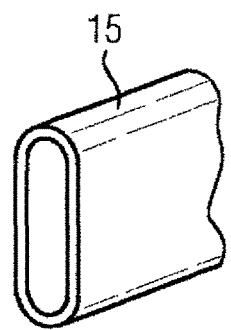
Figure 8:
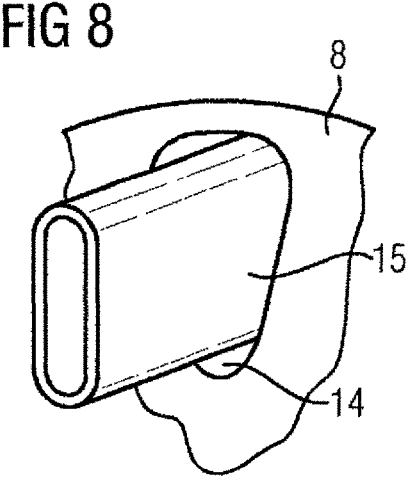
Figure 9:
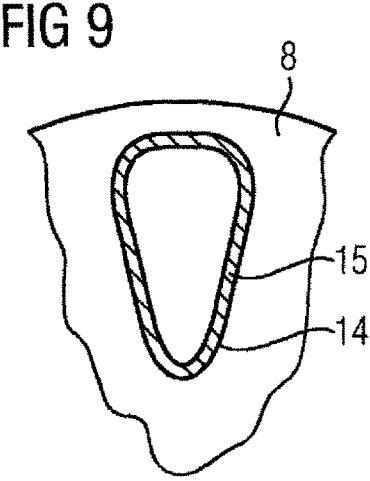

FIG. 6 shows a laminated core 8 with axially extending slots 14 in which now a hollow section as shown in FIG. 7, in particular a hollow rod made of copper, is inserted into the laminated core 8 as shown in FIG. 8. This hollow section is expanded by means of a high-pressure assembly process and designed such that the lining, i.e. the walls of the hollow profile of the rod 15, now nestles in a positive-fitting manner on the side walls of the slot 14.

Figure 10:
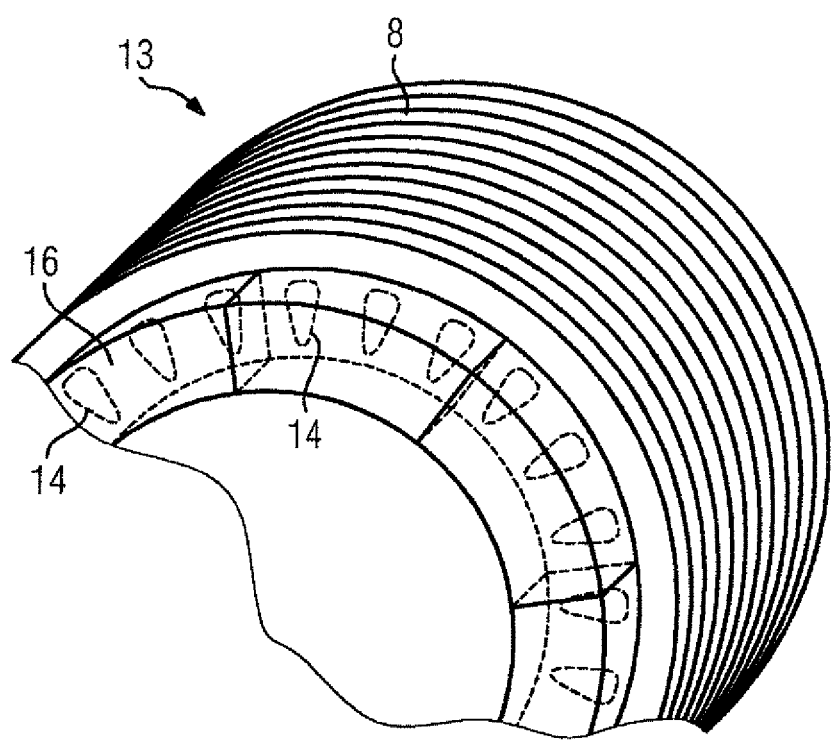

Filling the remaining hollow space within the hollow profile, in particular the conductor bar 15, and simultaneously casting the end rings 13 onto the end face of the rotor 7 is a simple way of producing a cage rotor, as shown in a partially perspective representation in FIG. 10. This cage rotor now has conductor bars 15 with a comparatively good electrically conductive material on their outer edge in the slot 14, while the rest of the slot 14 contains comparatively poorly conductive material.

To simplify representation, FIG. 10 does not show any hollow profiles protruding out of the slot 14. For elucidation, FIG. 10 further indicates cross-sectional surfaces of the end ring 13 that are not intended to represent cut surfaces of the end ring 13.

As shown in FIG. 10 or also as shown in FIG. 4 or FIG. 5, the end ring 13 is arranged directly on the end face of the laminated core in the rotor 7. It is also possible to arrange the end ring 13 extending axially from the end face of the laminated core. Herein, the hollow profiles 15 protrude from the slot 14 and only enter the end ring 13 after a predetermined axial distance.

Figure 11:
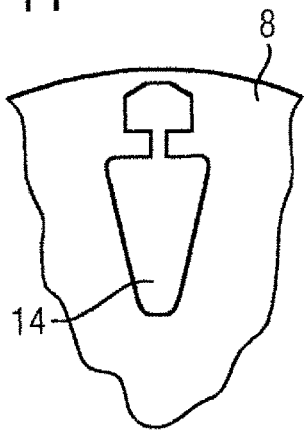
FIGS. 11 to 13 a further production method.
Figure 12:
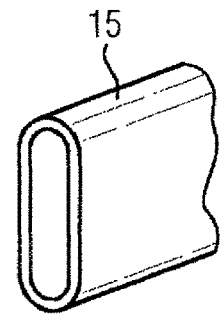
Figure 13:
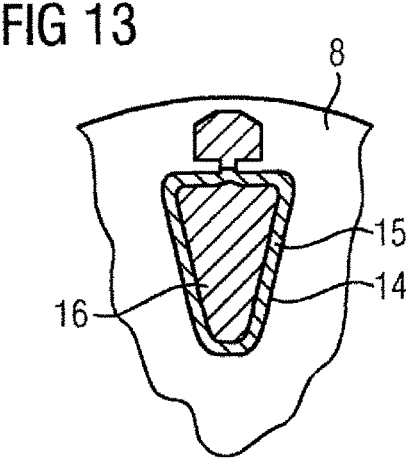

FIG. 11 to FIG. 13 show the use of the invention with other slot shapes that are developed such that now a special starting cage is formed, wherein, for a normal operating mode, the conductive copper is still provided on the radially outer edge of the slot 14. Here again, there is a laminated core 8 with axially extending slots 14 into which now a hollow section—i.e. the conductor bar 15—in particular a hollow rod made of copper is inserted. This hollow section is formed and expanded by means of a high-pressure assembly process such that the lining of the hollow profile of the conductor bar 15 now nestles in a positive-fitting manner on the side walls of the slot 14, in this case the lower part of the double slot in the rotor 7. The upper part separated from the lower part of the slot 14 is also filled with aluminum.

Figure 14:
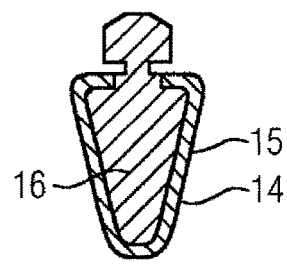
FIG. 14 a detail view of a slot.

In FIG. 14, a hollow conductor bar 15 with an axially extending slit 24 as shown in FIG. 15 has been inserted. Unlike the case in FIG. 13, hence, the cast-in material in the lower and upper part of the slot 14 is in contact and can in particular be produced in one casting process.

Figure 16:
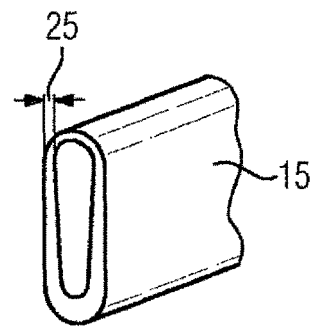

When considered in the circumferential direction, a hollow conductor bar 15 as shown in FIG. 16 has different wall thicknesses 25, which inter alia ultimately permits the optimization of the start-up behavior of an asynchronous machine.

Figure 17:
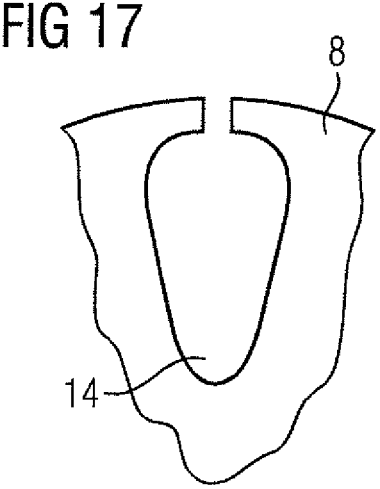
FIG. 17 a detail view of a partially open slot.

Also conceivable are combinations of the embodiments of the hollow profiles relating to wall thicknesses, cross section, materials, slit widths etc. within a rotor 7 or within a slot 14, for example within a slot that is partially open at a radially outer edge, as shown in FIG. 17.

The slot shapes shown here should not be interpreted as being restrictive; instead, the invention can also be used in laminated cores of rotors with other slot shapes such as tapered-bar slots, double slots, double-bar slots, drop-bar slots and high-bar slots.

In principle, the inventive concept is also applicable to stators in asynchronous machines or synchronous machines.

Due to the advantageous overload and start-up behavior, including with respect to load torques, asynchronous motors with such rotors, are in particular used in e-cars, traction drives and also in cranes, elevators, conveyors or centrifuges.

What is claimed is:

1. A method for producing a rotor of an asynchronous machine with a cage rotor, said method comprising:
   punching and stacking laminations to form a laminated core composed of a plurality of partial laminated cores having slots and spaced-apart from one another by a predetermined spacing;
   axially aligning the slots of the partial laminated cores;
   inserting a hollow pipe of a first electrical conductivity in the aligned slots of the partial laminated cores along a length of the laminated core in an axial direction;
   filling the hollow pipe by high-pressure die-casting with a material of a second electrical conductivity which is less than the first electrical conductivity and simultaneously expanding the hollow pipe due to the high pressure along its entire length perpendicular to the axial direction to establish a positive contact between an outer wall of the hollow pipe and a side wall of the slots, and
   simultaneously during the high-pressure die-casting forming end rings on an end face of the laminated core, with at least 65% of the material of the second electrical conductivity being surrounded by a material of the first electrical conductivity in a circumferential direction.

2. The method of claim 1, wherein the hollow pipe is made of copper.

3. The method of claim 1, wherein the material filling the hollow pipe is aluminum.

4. The method of claim 1, wherein the predetermined spacing between the partial laminated cores comprises a cooling gap.

5. The method of claim 1, wherein the hollow pipe has different wall thicknesses in the circumferential direction.

6. The method of claim 1, wherein some of the slots in the laminated core are partially open in sections at a radially outer edge.

7. The method of claim 1, wherein an inner contour of the slots is different from an outer contour of the inserted hollow pipe before expansion of the hollow pipe.

* * * * *

UNITED STATES PATENT AND TRADEMARK OFFICE
CERTIFICATE OF CORRECTION

PATENT NO. : 10,181,775 B2  
APPLICATION NO. : 15/566624  
DATED : January 15, 2019  
INVENTOR(S) : Matthias Scherer, Josef Niedermeyer and Uwe Scharf Page 1 of 1

It is certified that error appears in the above-identified patent and that said Letters Patent is hereby corrected as shown below:

On the Title Page

Under [73] Assignee:  
Replace "Audi AG" with -- Siemens Aktiengesellschaft --.

Signed and Sealed this  
Sixteenth Day of June, 2020

Andrei Iancu  
*Director of the United States Patent and Trademark Office*